United States Patent
Kim et al.

(10) Patent No.: US 7,516,187 B2
(45) Date of Patent: Apr. 7, 2009

(54) REMOTE CONTROL SYSTEM FOR HOME APPLIANCE NETWORK AND METHOD FOR OPERATING THE SAME

(75) Inventors: Chang Ho Kim, Seoul (KR); Dae Sung Wang, Seoul (KR); Yeon Kyoung Lee, Kyungki-do (KR); Il Hoon Ji, Seoul (KR); Ki Tae Oh, Kyungki-do (KR); Sang Kyun Lee, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 926 days.

(21) Appl. No.: 10/385,474

(22) Filed: Mar. 12, 2003

(65) Prior Publication Data

US 2004/0006647 A1    Jan. 8, 2004

(30) Foreign Application Priority Data

Jul. 3, 2002    (KR)    ............... 10-2002-0038380

(51) Int. Cl.
*G06F 15/16*    (2006.01)
*G06F 15/173*    (2006.01)

(52) U.S. Cl. ............... 709/208; 709/217; 709/224

(58) Field of Classification Search ............... None
See application file for complete search history.

(56) References Cited

U.S. PATENT DOCUMENTS

| | | | | |
|---|---|---|---|---|
| 6,101,182 A * | 8/2000 | Sistanizadeh et al. | ....... | 370/352 |
| 6,374,295 B2 * | 4/2002 | Farrow et al. | ............... | 709/223 |
| 6,823,454 B1 * | 11/2004 | Hind et al. | ............... | 713/168 |
| 7,266,840 B2 * | 9/2007 | Gruber | ............... | 726/9 |
| 2002/0078198 A1 * | 6/2002 | Buchbinder et al. | ......... | 709/224 |
| 2003/0001883 A1 * | 1/2003 | Wang | ............... | 345/736 |
| 2003/0009537 A1 * | 1/2003 | Wang | ............... | 709/219 |

FOREIGN PATENT DOCUMENTS

JP    10-94024    4/1998

(Continued)

OTHER PUBLICATIONS

English language Abstract of JP 2002-152856 (May 2002).

(Continued)

*Primary Examiner*—John B. Walsh
(74) *Attorney, Agent, or Firm*—Greenblum & Bernstein, P.L.C.

(57) ABSTRACT

Disclosed are a remote control system for a home appliance network and a method for operating the same. The system includes a wired and wireless Internet network; at least one home server for controlling and managing a home network connected to a plurality of home appliances; and a central portal server for updating an IP (Internet Protocol) address to a varied IP address to manage the home server whenever an IP address allocated to the home server for using the Internet network varies, and for exchanging data with the home server. The system and method enable the central portal server to manage a plurality of home servers and remotely control a plurality of home appliances connected to the home network by allowing the home server to transmit a key message containing a varied IP address so that an existing IP address stored in a database of the central portal server can be updated to a new IP address when a home server using a dynamic IP is connected to the central portal server.

12 Claims, 5 Drawing Sheets

FOREIGN PATENT DOCUMENTS

| | | |
|---|---|---|
| JP | 2000-341325 | 12/2000 |
| JP | 2002-10341 | 1/2002 |
| JP | 2002-152856 | 5/2002 |

OTHER PUBLICATIONS

Vixie et al., "Dynamic Updates in the Domain Name System", IETF RFC 2136, IETF Network Working Group, downloaded from ftp://ftp.rfc-editor.org/in-notes/rfc2136.txt (Apr. 1997).

English language Abstract of JP 2000-341325, (Dec. 2000).

Yamazaki, "Home Net Work", AV Kaden kara Network taiou ga susumu, Shiromono Kaden wa Gyoukai Danatai Shudo de Tuiju, IKKEI Internet technology, NIKKEI BP sha, No. 60, pp. 99-107, (Jun. 2002).

English language Abstract of JP 2002-10341, (Jan. 2002).

English language Abstract of JP 10-94024, (Apr. 1998).

* cited by examiner

REMOTE CONTROL SYSTEM FOR HOME APPLIANCE NETWORK AND METHOD FOR OPERATING THE SAME

RELATED APPLICATION

The present disclosure is related to subject matter contained in Korean Patent Application No. 2002-38380, filed on Jul. 3, 2002, which is expressly incorporated herein, by reference, in its entirety.

BACKGROUND OF THE INVENTION

1. Field of the Invention

The present invention relates to a remote control system for a home appliance network and a method for operating the same. More particularly, the present invention relates to a remote control system for a home appliance network and a method for updating information of the same, the system and method enabling a central portal server to manage a plurality of home servers by allowing a home server to transmit a key message containing an IP (Internet Protocol) address so that an existing IP address stored in a database of the central portal server can be updated to a new IP address when the home server, using a dynamic IP, is connected to the central portal server.

2. Description of the Related Art

Recently, home-appliance network systems that connect a plurality of home appliances to a network installed inside a home or building have proliferated. In addition, the construction of a system for remotely controlling the home appliances, so that the home appliances can be remotely controlled from inside a home or outside a building, using a terminal connected to the Internet has become popular.

Accordingly, a user can remotely input a control command that is processed by a central portal server that controls an entire home appliance network connected to a plurality of home servers. The central portal server can request the home servers to perform an operation corresponding to the remotely inputted control command by exchanging data with the home servers.

However, a typical home receives a fixed IP (Internet Protocol) address or dynamic IP address from an Internet service provider to which the home subscribes so that the home can be connected to an Internet network. Installation cost and maintenance cost are incurred for using Internet service provided to a fixed IP address. Since a usage rate is remarkably low as compared with the service costs, many homes use an Internet connection service providing a dynamic IP address.

Thus, because a newly allocated dynamic IP address is different from an existing IP address that is inputted into the central portal server whenever a home appliance network using the Internet connection service is connected to the Internet, there is a disadvantage in that the central portal server does not appropriately connect to the home server. Hence, the home servers cannot be adequately managed and remotely controlled by the central portal server.

SUMMARY OF THE INVENTION

To solve the above described problems, an object of the present invention is to provide a remote control system for a home appliance network and a method for operating the same, the system and method enabling a central portal server to manage a plurality of home servers and remotely control a plurality of home appliances connected to a home network by allowing a home server to transmit a key message containing a varied dynamic IP (Internet Protocol) address. As a result, an existing IP address stored in a database of the central portal server can be updated with a new IP address when a home server, using a dynamic IP, is connected to the central portal server.

In accordance with one aspect of the present invention, the above and other objects can be accomplished by the provision of a remote control system for a home appliance network. The remote control system includes a wired and wireless Internet network; at least one home server that controls and manages a home network connected to multiple home appliances; and a central portal server for updating a varied IP (Internet Protocol) address, to manage the home server when an IP address allocated to the home server for using the Internet network varies. Additionally, the central portal server exchanges data with the home server.

In accordance with another aspect of the present invention, a method is provided for operating a remote control system for a home appliance network. The method includes allowing a home server to communicate with a central portal server using a secured socket; allowing the central portal server to process a key message containing IP (Internet Protocol) address information and control information received from the home server; and allowing the home server to periodically transmit a status message.

In accordance with yet another aspect of the present invention, a method is provided for operating a remote control system for a home appliance network. The method includes allowing a home server to be connected to a central portal server using a secured socket; allowing the central portal server to process a key message containing IP (Internet Protocol) address information and control information received from the home server; allowing the home server to periodically transmit a status message; and terminating a connection with the home server if the status message is not received for a predetermined period of time.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The preferred embodiments of the present invention will be described in detail below with reference to the annexed drawings.

Figure 1:
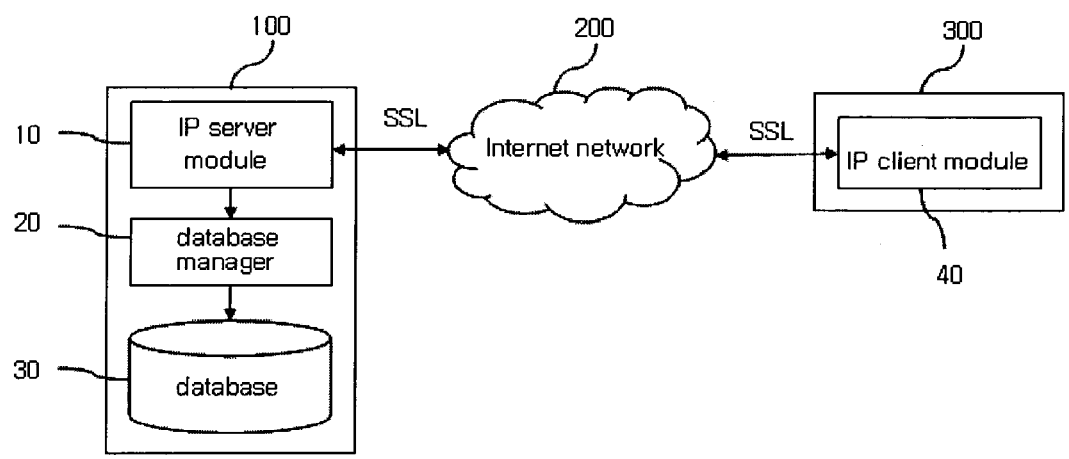
FIG. 1 is a view illustrating a configuration of a remote control system for a home appliance network in accordance with the present invention.
Figure 2:
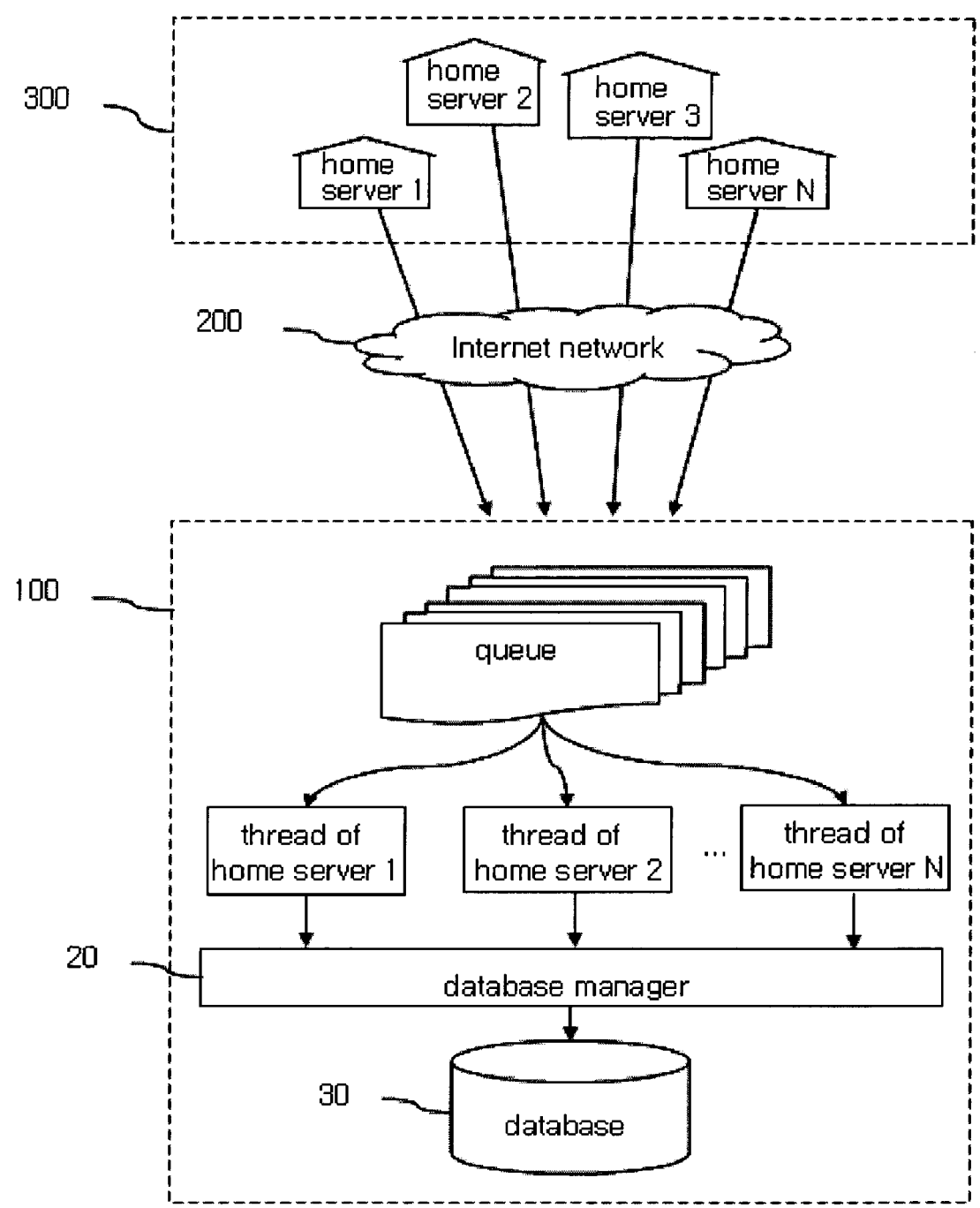
FIG. 2 is a view illustrating a flow of a work process of a central portal server included in the remote control system for the home appliance network in accordance with the present invention.

FIG. 1 is a view illustrating an exemplary configuration of a remote control system for a home appliance network, in accordance with the present invention. FIG. 2 is a view illustrating an exemplary flow of a work process of a central portal server included in the remote control system for the home appliance network, in accordance with the present invention.

First, the present invention relates to a remote control system for a home appliance network that allows a central portal server 100 to control and manage at least one home server 300. The home server manages a home network connected to a plurality of home appliances. The central portal server 100 and a plurality of home servers 300 can communicate through a wired and/or wireless Internet network 200 and exchange data.

The central portal server 100 includes an IP server module 10 for receiving a key message that contains IP address information from the home server 300 when an IP address of the home server 300 varies. The central portal server also includes a database 30 for storing information of the key message transmitted to the IP server module 10; and a database manager 20 for managing and controlling the database 30.

The home server 300 is controlled by the central portal server 100 and thus the home server 300 can control the home appliance. An operation of a home appliance can be controlled through the central portal server 100 only when the central portal server 100 identifies the IP address of the home server 300.

The home server 300 is allocated, and stores, a dynamic IP address allocated to be connected to the Internet network 200. The home server 300 and includes an IP client module 40 for transmitting the dynamic IP address to the central portal server 100. When the IP client module 40 tries to connect to the Internet network 200, it creates a key message containing a newly allocated IP address from an ISP (Internet Service Provider) and then automatically transmits the key message to the IP server module 10 of the central portal server 100 so that the central portal server 100 can identify the IP address allocated to the home server 300.

The key message is a message in which a varied IP address, a user ID, a user password and the user's control information are packetized. The central portal server 100 and the home server 300 are connected using a secured socket. Thus, when the home server 300 tries to connect to the central portal server 100, the key message containing the ID and the password allocated to a manager of the home server 300 is transmitted to the central portal server 100 so that an access right, i.e., a right of access, to the central portal server 100 can be authenticated.

As shown in FIG. 2, key messages transmitted from the home servers 300 are queued in queues and then separated as user information (threads) on the basis of the ID and password. An IP address of a user corresponding to the ID and password is updated in the database 30.

The database 30 stores data necessary for allowing the central portal server 100 to manage and control the home appliances. More particularly, the database 30 stores a Web page provided to a remote control operator who wishes to control the home network, as well as various application programs and user information provided for an interface with the Web page. The key message containing a varied IP address of the home server 300 and received by the central portal server 100 is stored in the database 30 through the database manager 20.

The home server manager's ID and password stored in the database 30 are checked. If the manager (user) is authenticated as a person having an access right, an existing IP address of the manager (user) is updated to a new IP address.

Since the IP address of the home server 300 is updated and the central portal server 100 can be connected to the home server 300 through the Internet network 200, the remote control operator can control the home servers 300 and the home appliances through the central portal server 100.

The home server 300 connected to the central portal server 100 by the secured socket periodically transmits an alive (update) message containing a small amount of data for a predetermined period of time to maintain the connection with the central portal server 100.

The alive message is a message in which a varied IP address, a user ID and a user password are packetized. Because an initial connection time for a secured socket connection after transmitting the user ID and the user password is significant, the alive message is used to request continued connection continuation of a previously connected secured socket. Thus, a delay of a control of a home appliance can be prevented. Accordingly, the home servers 300 request the central portal server 100 to maintain a connection by transmitting the alive message to the central portal server 100, and the central portal server 100 terminates the secured socket connection if it does not receive the alive message from the home servers 300 within a predetermined period of time.

An operating method of the remote control system for the home appliance network described above is as follows.

Figure 3:
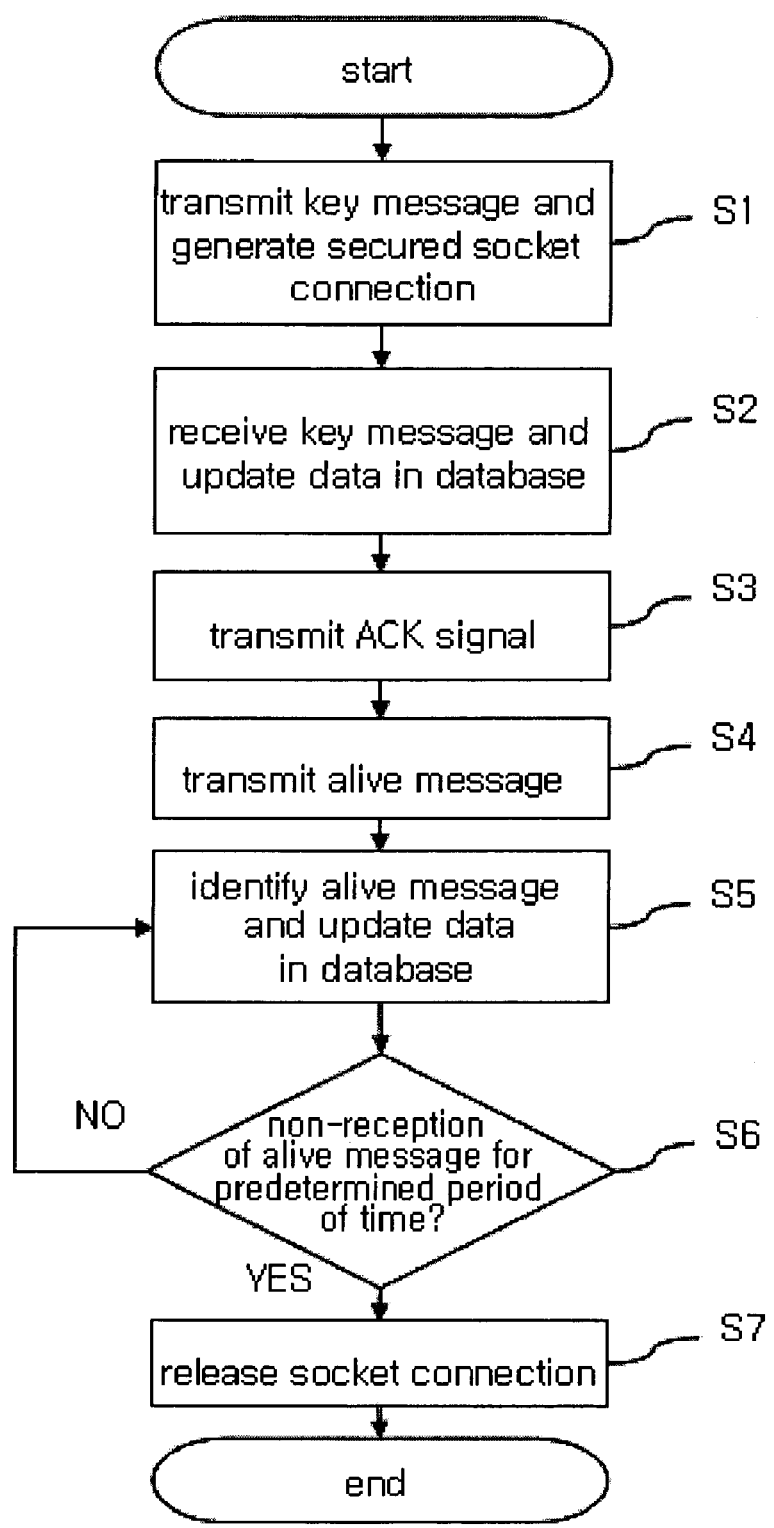
FIG. 3 is a flow chart illustrating an operating method of the remote control system for the home appliance network in accordance with the present invention.
Figure 4:
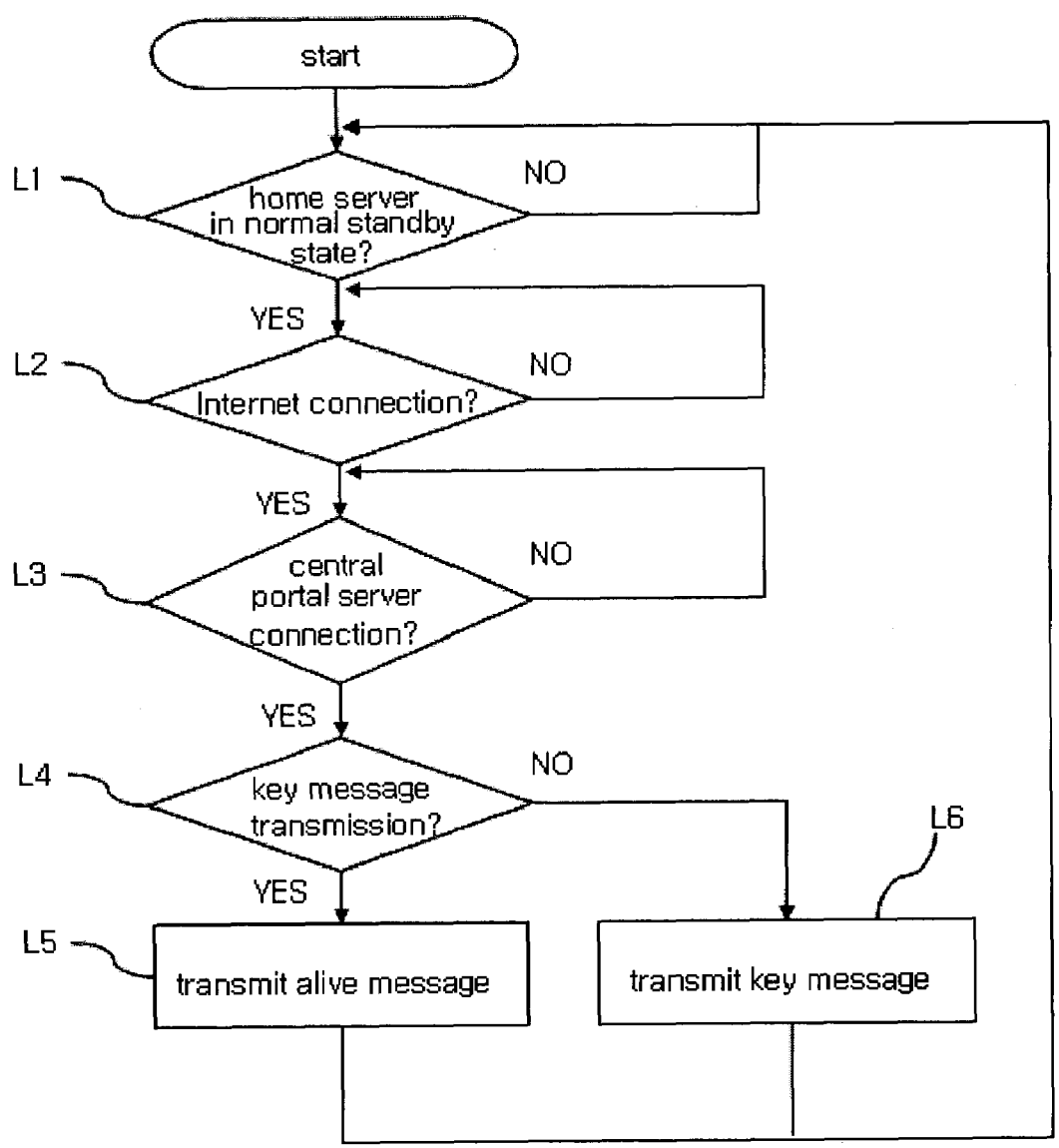
FIG. 4 is a flow chart illustrating an operating method of an IP (Internet Protocol) client module of a home server in accordance with the present invention.
Figure 5:
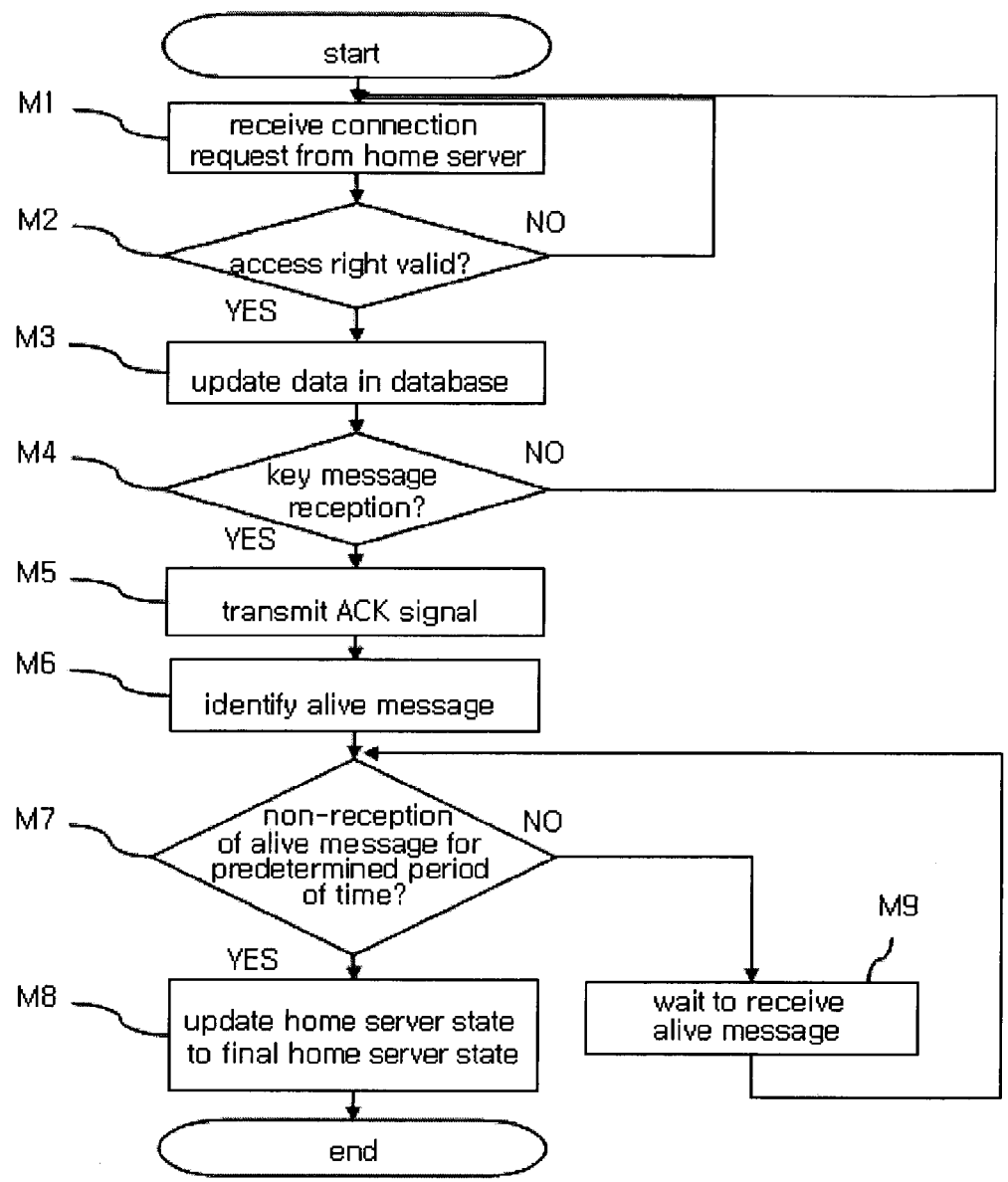
FIG. 5 is a flow chart illustrating an operating method of an IP server module of the central portal server in accordance with the present invention.

FIG. 3 is a flow chart illustrating an operating method of the remote control system for the home appliance network in accordance with the present invention. FIG. 4 is a flow chart illustrating an operating method of an IP client module of a home server in accordance with the present invention. FIG. 5 is a flow chart illustrating an operating method of an IP server module of the central portal server in accordance with the present invention.

In FIG. 4, it is determined, at step L1, whether the home server is in a normal standby state so that the home server can control the home appliance network connected to a plurality of home appliances. If the home server is in the normal standby state, a determination is made whether the home server is connected to the Internet network at step L2. When the home server 300 is connected to the Internet network, it transmits a connection request to the central portal server at step L3 so that the home server can notify the central portal server of an IP address newly allocated from the ISP. The central portal server receives the connection request from the home server at step M1.

After generating a key message containing a user ID and a user password, the home server transmits the key message to the IP server module of the central portal server and it is determined, at step L4, whether the transmission of the key message has been completed. If the transmission of the key message has not been completed, the key message is transmitted to the central portal server at step L6. The central portal server receives the key message and checks the ID and the password contained in the key message. It is determined, at step M2, whether an access right to the home server is valid. If the access right to the home server is authenticated, a connection attempt to the home server is formally permitted and the central portal server and the home server are connected by a secured socket at step S1.

The key message is transmitted in the form of a varied IP address, a user ID, a user password and the user's control information. The database manager of the central portal server receiving the key message manages the database so that an existing IP address contained in the user information is updated to a new IP address at step S2.

The central portal server updates an existing IP address to the new IP address in the database at step M3, and determines, at step M4, whether the key message has been appropriately received. If the key message is appropriately received and the existing IP address is appropriately updated to the new IP address of the home server in the database, the central portal server transmits an acknowledgement (ACK) signal to the home server at step M5 (S3).

When the home server does not immediately terminate a secured socket connection with the central portal server, the home server periodically transmits an alive message to the central portal server for a period of time at step L5, thereby saving a time required for obtaining a new secured socket connection. A signal indicating a state of the home server can be rapidly transmitted to the central portal server at step S4.

The alive message is a message in which an IP address, a user ID and a user password coupled to a system for the home server are packetized. Accordingly, after the central portal server checks which home server transmits the alive message through, e.g., the ID and the password at step S5 or M6, the central portal server maintains the secured socket connection with a corresponding home server.

The central portal server determines whether the alive message is not received within the predetermined period of time at step S6 or M7.

If the alive message is not received from the home server within the predetermined period of time at step M7, the central portal server cuts off a connection by releasing the secured socket connection with the home server and updates a home server state to a final home server state in the database at step M8. Accordingly, when the remote control operator accesses the central portal server and tries to remotely control the home server, the operator can identify whether the home server is connected to the central portal server or not. If the predetermined period of time has not elapsed, the central portal server waits to receive the alive message, which is transmitted by the home server, while maintaining the secured socket connection with the home server at step M9 (S7).

As described above, a remote control system for a home appliance network and a method for operating the same in accordance with the present invention have been described with reference to the above-described embodiments and the accompanying drawings, but the present invention is not limited to the above-described embodiments and the accompanying drawings.

As should be apparent from the above description, the present invention provides a remote control system for a home appliance network and a method for updating the information of the same, the system and method enabling a central portal server to manage a plurality of home servers by allowing a home server to transmit a key message containing an IP address so that an existing IP address stored in a database of the central portal server can be updated to a new IP address when a home server, using a dynamic IP, is connected to the central portal server. The system and method of the present invention stably and conveniently allow remote control when a plurality of home appliances are connected to a home network through the central portal server.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home server that controls a home communications network connecting a plurality of home appliances, the home server comprising:

an internet protocol client module configured to create and forward to a central portal server a key message when a varied internet protocol address allocated to the home server for using the internet network varies, the key message including the varied internet protocol address, and a user identification and a user password allocated to a manager of the home server, wherein the central portal server is configured to store the varied internet protocol address to enable remote control of the home server, wherein the central portal server is configured to update the varied internet protocol address when the user identification and the user password are authenticated, to enable the remote control of the home server, and wherein the home server periodically transmits an update message after a connection with the central portal server, the update message comprising the varied internet protocol address, the user identification and the user password.

2. The home server as set forth in claim 1, wherein the home server is configured to connect to the central portal server using a secured socket that requires an authentication procedure using the user identification and the user password.

3. The home server as set forth in claim 1, wherein the connection with the central portal server is terminated when the update message is not transmitted for a predetermined period of time.

4. A central portal server for managing a home server that controls a home communications network connecting a plurality of home appliances, the central portal server comprising:

an internet protocol server module configured to receive from the home server a key message when a varied internet protocol address allocated to the home server for using the internet network varies, the key message including the varied internet protocol address, and a user identification and a user password allocated to a manager of the home server, the central portal server storing the varied internet protocol address to enable remote control of the home server, wherein the central portal server is configured to update the varied internet protocol address when the user identification and the user password are authenticated, to enable the remote control of the home server, and wherein the central portal server periodically receives an update message transmitted by the home server after a connection with the home server, the update message comprising the varied internet protocol address, the user identification and the user password.

5. The central portal server as set forth in claim 4, further comprising:

a database that stores the key message received from the home server; and a database manager for managing and controlling the database, wherein the central portal server is configured to connect to the home server using a secured socket that requires an authentication procedure using the user identification and the user password.

6. The central portal server as set forth in claim 4,
wherein the connection with the home server is terminated when the update message is not received for a predetermined period of time.

7. A method for operating a home server that controls a home communication network connecting a plurality of home appliances, comprising:
creating a key message when a varied internet protocol address allocated to the home server for using the internet network varies, the key message including the varied internet protocol address, and a user identification and a user password allocated to a manager of the home server;
forwarding the key message to a central portal server, the central portal server being configured to store the varied internet protocol address to enable remote control of the home server; and
periodically transmitting an update message after a connection with the central portal server, the update message comprising the varied internet protocol address, the user identification and the user password,
wherein the central portal server is configured to update the varied internet protocol address when the user identification and the user password are authenticated, to enable the remote control of the home server.

8. The method for operating a home server of claim 7,
wherein the home server is configured to connect to the central portal server using a secured socket that requires an authentication procedure using the user identification and the user password.

9. The method for operating a home server of claim 7,
wherein the connection with the central portal server is terminated when the update message is not transmitted for a predetermined period of time.

10. A method for operating a central portal server that manages a home server that controls a home communications network connecting a plurality of home appliances, comprising:
receiving from the home server a key message when a varied internet protocol address allocated to the home server for using the internet network varies, the key message including the varied internet protocol address, and a user identification and a user password allocated to a manager of the home server, the central portal server storing the varied internet protocol address to enable remote control of the home server,
updating the varied internet protocol address when the user identification and the user password are authenticated, to enable the remote control of the home server, and
periodically receiving an update message transmitted by the home server after a connection with the home server, the update message comprising the varied internet protocol address, the user identification and the user password.

11. The method for operating a central portal server as set forth in claim 10, further comprising:
connecting to the home server using a secured socket that requires an authentication procedure using the user identification and the user password,
wherein the central portal server includes a database that stores the key message received from the home server, and a database manager for managing and controlling the database.

12. The method for operating a central portal server as set forth in claim 10, further comprising:
terminating the connection with the home server when the update message is not received for a predetermined period of time.

* * * * *